(12) United States Patent
Chen et al.

(10) Patent No.: US 8,204,066 B2
(45) Date of Patent: Jun. 19, 2012

(54) METHOD FOR PREDICTING A PORT NUMBER OF A NAT EQUIPMENT BASED ON RESULTS OF INQUIRING THE STUN SERVER TWICE

(75) Inventors: Yi-Wei Chen, Taipei (TW); Chin-Han Lin, Taipei (TW); Ying-Dar Lin, Taipei (TW); Chien-Chao Tseng, Taipei (TW)

(73) Assignee: D-Link Corporation, Taipei (TW)

( * ) Notice: Subject to any disclaimer, the term of this patent is extended or adjusted under 35 U.S.C. 154(b) by 966 days.

(21) Appl. No.: 12/230,274

(22) Filed: Aug. 27, 2008

(65) Prior Publication Data

US 2009/0323559 A1  Dec. 31, 2009

(30) Foreign Application Priority Data

Jun. 26, 2008  (TW) ................................ 97123917 A

(51) Int. Cl.
*H04L 12/56* (2006.01)
(52) U.S. Cl. ............. 370/401; 370/466; 726/11; 726/12
(58) Field of Classification Search .................. None
See application file for complete search history.

(56) References Cited

U.S. PATENT DOCUMENTS

| 7,590,758 | B2 * | 9/2009 | Takeda et al. ................. 709/245 |
| 7,751,387 | B2 | 7/2010 | Hwang et al. |
| 2004/0153858 | A1 | 8/2004 | Hwang |
| 2007/0076729 | A1 * | 4/2007 | Takeda ......................... 370/401 |

OTHER PUBLICATIONS

Y. Takeda, "Symmetric NAT Traversal using STN", Internet Engineering Task Force, Jun. 2003.*

* cited by examiner

*Primary Examiner* — Gregory Sefcheck
*Assistant Examiner* — Salvador E Rivas
(74) *Attorney, Agent, or Firm* — Bacon & Thomas, PLLC

(57) ABSTRACT

We propose a method for predicting a port number of a NAT equipment according to results of inquiring a STUN server twice in this invention. A network terminal device A in a private network sends an inquiry packet to the STUN server before and after sending a hole punching request, acquires two endpoint mappings of the NAT equipment used respectively in the two inquiries from the STUN server, and delivers the endpoint mappings to another network terminal device B in another private network through a SIP server. The network terminal device B predicts a range of port numbers of the NAT equipment probably used when the hole punching request was sent, according to the endpoint mappings and a port differential of the NAT equipment, and sends packets to the predicted port numbers sequentially until a response packet is received from the network terminal device A. Hence, a connection channel is established.

5 Claims, 4 Drawing Sheets

METHOD FOR PREDICTING A PORT NUMBER OF A NAT EQUIPMENT BASED ON RESULTS OF INQUIRING THE STUN SERVER TWICE

FIELD OF THE INVENTION

The present invention relates to a method for predicting a port number of a Network Address Translation (NAT) equipment, and more particularly to a method for predicting a port number of a NAT equipment according to results of inquiring a STUN (Simple Traversal of UDP (User Datagram Protocol) over NAT) server twice.

BACKGROUND OF THE INVENTION

With the rapid development of computer and communication technologies, the carrying of voice, data, image and other kinds of messages via public network has become a major business line that network service providers endeavor to develop. Network service providers generally rely on telecommunication service networks to provide all kinds of comprehensive and open network services involving voice, data, multimedia and so on. While the construction modes of telecommunication service networks are presently under change, an important objective of development is to separate application services from transmission technology, so that all application services can work on any type of transmission technology without restriction. In other words, the telecommunication service networks in the future will be service-oriented networks, where network services are separated from network transmission control, so as to achieve the goal that network application services are truly independent beyond the network transmission and can be offered flexibly and effectively. Therefore, in the future telecommunication service networks, users will be allowed to arrange and define their service characteristics by themselves without worrying about the types of network transmissions and the types of terminals. This feature will make services and applications more flexible. In other words, it is originally impossible for any existing information network, such as a telecommunication network, a computer network or a cable television network, to be the sole basic platform and to develop services with attributes different from the attributes of the network itself. However, with the development of IP technology in recent years, it is now possible to apply advanced IP technology to integrate telecommunication networks (wire-based and wireless), computer networks and cable television networks into a unified network, or is called the "three-in-one" network. This network may further merge with the mobile communication networks to the so-called "four-in-one" network, where a variety of IP-based businesses can communicate with one another on different networks through IP protocols.

Urged by the aforesaid network-based businesses and under the trend of network integration, future telecommunication service networks will adopt a distributed network structure, whose application functions, control functions and transmission functions are independent of one another, to effectively transmit voice, video and multimedia information within different networks. During network construction, the existing information networks will be able to change smoothly to the future telecommunication networks, with the advantage that existing network equipments and terminal equipments can be directly used to the future telecommunication networks. In addition, many of the existing IP-based protocols will still be used. However, how to traverse private networks is the most serious problem.

More particularly, a future telecommunication service network will be one integrated with voice, data, multimedia and mobile services, and can be divided into the following network layers:

(1) Access layer: The access layer is composed of various gateways, intelligent access terminal equipments and integrated access equipments. It uses a plurality of accessing approaches (including broadband accessing, mobile accessing, etc.) to make different kinds of users connect to the network and to convert information formats into those capable of being transmitted on the network.

(2) Transmission layer: The transmission layer refers to the carrying network in the telecommunication service network and serves to provide a public transmission platform for transmitting all kinds of information and media streams in the way mostly by adopting packet transmission while so far the main transmission network would be the broadband IP network.

(3) Control layer: In this layer, comprehensive control and processing functions such as invocation processing control, access protocol selection, interconnection and intercommunication are carried out while business logic is substantially executed. The control layer determines the businesses a user receives, and controls the processing of business flows by low-level network elements. The control layer is implemented mainly by a soft switch equipment.

(4) Business layer: This layer handles business logic, provides user-oriented integrated services, and performs business customization and business-related management functions, such as business verification and business billing.

The traversal problem in broadband access of a future telecommunication service network is no other than the broadband access problem of an edge access layer in the telecommunication service network. More particularly, the core carrying network and broadband access of a future telecommunication service network are built on existing IP networks, where access users must be addressed via IP addresses. However, the fact is, as the Internet speedily expands, IP addresses are seriously depleting. To solve this problem, a great number of corporate networks and local area networks deploy Network Address Translation (NAT) equipment at their network outlets. A NAT, an Internet standard defined in RFC 1631, is typically installed in a router located at the border of a private network and a public network for performing IP address translation on packets sent from a network terminal device in the private network, so that a plurality of network terminal devices in the private network are allowed to share a public IP address when connecting to the Internet. More specifically, when an IP data packet sent from the private network reaches the NAT equipment, the NAT equipment translates a private network IP address into a legal IP address in the public network. When a packet sent from outside the private network reaches the NAT equipment, the NAT equipment translates a public network address into a private network address by checking with data in a mapping table stored in the NAT equipment, and then forward the packet to an internal receiving point. For a general data packet, the NAT equipment usually only has to conduct IP address and port number translation. However, in applications of such standards as H.323, Session Initiation Protocol (SIP) and Media Gateway Control Protocol (MGCP), the real media connection data is stored and delivered in a data packet loading, which give rise to the following problem. Assuming a terminal A initiates a calling to a terminal B, and a soft switch relays the calling information of the terminal A to the terminal B, then according to protocols such as H.323 and SIP, the terminal B will acquire from the data packet loading a private network IP address of the terminal A and then attempts to establish a Real-time Transport Protocol (RTP) connection with the terminal A. Nonetheless, the IP address, which is private, cannot be used to establish a communication connection between the terminals A and B because private addresses are not recognizable in public networks. As a result, the NAT only allows an internal network terminal device to set up an outbound communication connection but does not allow a network terminal device outside the network to communicate with network terminal devices within the network. Therefore, although the NAT is capable of ensuring network security, it also blocks communication signals (such as VoIP phone signals) coming from external networks, so that the NAT protocol becomes a technical barrier for enterprise customers in using network communication services (such as VoIP phone services).

In view of this, network service and software providers (such as Microsoft and Cisco) are now in collaboration to develop a new Interactive Connectivity Establishment (ICE) protocol and intend to incorporate the ICE protocol into application programs (such as application programs of Microsoft) which, when employed in a network system by using the NAT protocol, allow network terminal devices within and outside the network to exchange NAT equipment data (such as NAT types and port differentials λ of a NAT equipment) in a controlled manner. However, the network protecting function of a NAT equipment still blocks network communication signals coming from external networks, preventing the network terminal devices from directly establishing connection channels therebetween. Consequently, peer-to-peer connection is unattainable and mutual data access cannot be achieved.

Therefore, if a direct peer-to-peer connection is established between network terminal devices of different private networks, the aforementioned problem with NAT equipments between different private networks must be solved. When two network terminal devices located respectively in two private networks try to set up a direct peer-to-peer connection, one of the network terminal devices has to know the endpoint mapping of the other network terminal device in the peer nodes. For example, the current network system where IPv4 addresses (i.e., addresses each having a 32-bit length and an address format of 210.130.1.1) are used, the endpoint mapping refers to mapping data of an IP address and a port number. Hence, the prerequisite for carrying out peer-to-peer connection between two network terminal devices is that two network terminal devices are able to acquire the endpoint mapping of each other. However, in a symmetric NAT equipment, endpoint mappings are not constant values, but are dynamically adjusted according to a preset port differential λ in the NAT equipment each time a packet is sent and received. Therefore, it is extremely difficult for a network terminal device of a private network to directly establish a peer-to-peer connection via a symmetric NAT equipment connected thereto with a network terminal device of another private network. To overcome this problem, attempts have been made to estimate, by predicting the range of, port numbers of a symmetric NAT equipment that are available for peer-to-peer connection. In practice, however, the symmetric NAT equipment dynamically allocates port numbers of packets sent and received so that, unless all the 65535 ports are completely detected via packets sent and received, it is impossible to accurately predict the range of port numbers available for the peer-to-peer connection. Therefore, inefficiency and insufficient accuracy are obviously two major drawbacks of the conventional approach of predicting the range of port numbers.

Consequently, it has been a major goal for many network service providers to design a network system wherein a network terminal device of a private network can speedily and accurately predict the range of port numbers of a symmetric NAT equipment in another private network, so that network terminal devices in the two private networks may promptly establish a connection channel for mutual communication or data access.

BRIEF SUMMARY OF THE INVENTION

In view of the aforementioned drawbacks of the prior art, the inventor of the present invention made great efforts in conducting research and experiments and finally succeeded in developing a method for predicting a port number of a NAT equipment according to results of inquiring a STUN server twice, as disclosed herein. With this method, it is hoped that a network terminal device in a private network can traverse a symmetric NAT equipment and set up a peer-to-peer connection channel with a network terminal device in another private network, thereby establishing mutual connection for data access.

An objective of the present invention is to provide a method for predicting a port number of a NAT equipment based on results of inquiring a STUN server twice. The method is applicable to a network system comprising a STUN server, a Session Initiation Protocol (SIP) server and at least two private networks, in which one of the private networks includes at least one first NAT equipment and at least one first network terminal device (such as a computer with a network interface, a web camera, a VoIP phone, a network drive, or a network printer) while the other private network includes at least one second NAT equipment and at least one second network terminal device, wherein the first NAT equipment is a symmetric NAT router and the first network terminal device is connected to the second network terminal device through the first NAT equipment, the STUN server, the SIP server, and the second NAT equipment sequentially. The method proceeds as follows. User agents (UAs) installed respectively in the first and second network terminal devices acquire their respective NAT equipment data (such as NAT types and the port differentials λ of the NAT equipments) from the STUN server through a STUN protocol, and send the NAT equipment data to each other via an Interactive Connectivity Establishment (ICE) protocol. The first network terminal device inquires the STUN server twice, i.e., before and after sending a hole punching request, and acquires two endpoint mappings (each including an IP address and a port number) of the first NAT equipment, that were used in the two inquiries, from the STUN server respectively. More particularly, the two endpoint mappings are a starting base NAT mapping of the first NAT equipment used in the first inquiry, and a bound base NAT mapping of the first NAT equipment used in the second inquiry. Then, the first network terminal device delivers the starting base NAT mapping and the bound base NAT mapping to the second network terminal device through the SIP server, so that the second network terminal device can accurately predict a range of port numbers of the first NAT equipment, that might have been used when the first network terminal device sent the hole punching request, according to the starting base NAT mapping, the bound base NAT mapping and the port differential λ of the first NAT equipment. The second network terminal device sends port-prediction packets to the predicted port numbers sequentially until a response packet is received from the first network terminal device and a connection channel is established with the first network terminal device. Thus, the first and second network terminal devices rapidly and accurately establish a connection channel for data access.

BRIEF DESCRIPTION OF THE DRAWINGS

The invention as well as a preferred mode of use, further objectives and advantages thereof will best be understood by reference to the following detailed description of an illustrative embodiment when read in conjunction with the accompanying drawings, wherein.

DETAILED DESCRIPTION OF THE PREFERRED EMBODIMENTS

Figure 1:
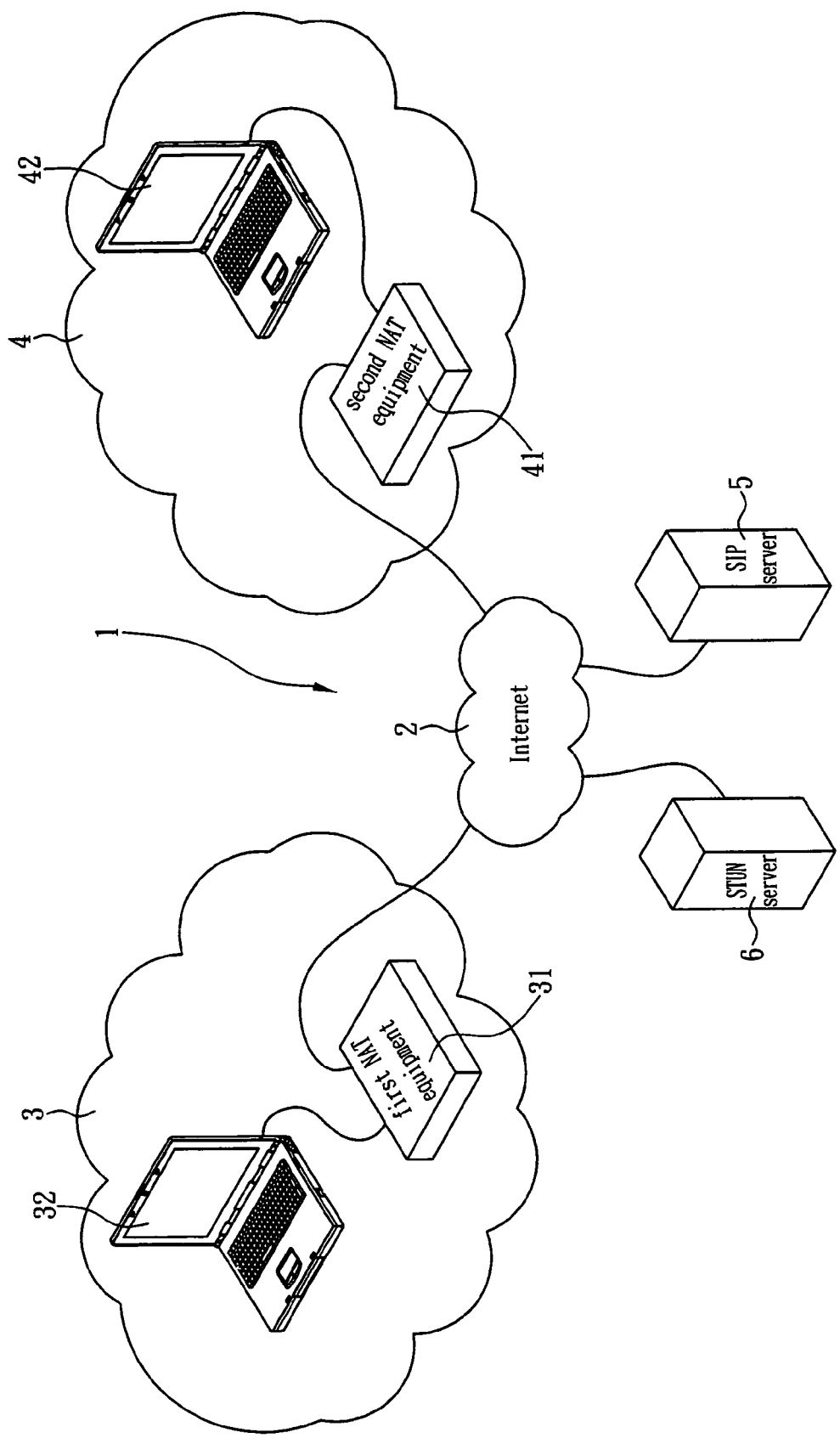
FIG. 1 is a schematic drawing of a network system according to the present invention.

The Session Initiation Protocol (SIP) is a communication protocol developed by the IETF MMUSIC workgroup for creating, modifying, and terminating a variety of interactive users' sessions including video and voice calls, instant messaging, online games and other multimedia interactive sessions. Like H.323, SIP is a major signaling protocol used in VoIP and is intended to provide a superset similar to the call processing functions of a public switched telephone network (PSTN), so as to carry out operations similar to those of a common telephone, such as dialing a number and generating a ring tone, a ring back tone or a busy signal, though ways of implementation and terminology are different. Generally, SIP is a peer-to-peer protocol and only requires a relatively simple core network, so that processing work can be distributed to intelligent endpoints (such as network terminal devices equipped with proper hardware or software) located at the edge of the network. Therefore, many SIP functions are realized at the endpoints, which are quite different from the case with the conventional PSTN, where processing work is completed at core network equipment. Using IP-based networks, SIP can work with many other protocols to solve signaling-related problems in a communication session. The Session Description Protocol (SDP) describes the details of a data flow in a session, like the specific IP ports and the types of decoders/encoders employed. The Real-time Transport Protocol (RTP) carries media flow such as voice and video contents. Although the media flow cannot traverse NAT routers in a simple way, most SIP user-ends can traverse NAT routers with the assistance of STUN, or use RTP proxies to traverse the old-style NAT routers that cannot recognize SIP.

STUN (Simple Traversal of UDP over NAT) is a communication protocol for determining what type of NAT environment a current network terminal device (such as a VoIP phone) is in, and for allowing a VoIP packet using SIP to traverse a NAT router, so that a VoIP phone supporting STUN can freely modify an correspondence relation of IP addresses and port numbers in a SIP/SDP message between a legal IP address and a virtual IP address, thereby enabling SIP and RTP packets to successfully traverse the NAT router without having to change the settings of the NAT router. In addition, a STUN server allows all the network terminal devices (such as computers behind a firewall) in a private network that are connected to the NAT router to carry out network communication connection with VoIP network service providers outside the private network. Through the STUN server, a user's network terminal device can find out such information as a public network address of the network terminal device, the type of NAT router the network terminal device is behind, and the UDP port the NAT router is contacting at an Internet endpoint that is bound by a local port. Such information can be used to set up UDP communication between two network terminal devices which are behind their respective NAT routers and thereby implement network communication connection. While SIP-based protocols use UDP packets to transfer audio and/or video data on the Internet, the two endpoints between which communication is desired are usually behind their respective NAT routers, so that a connection cannot be established therebetween in the traditional way. Therefore, this is why STUN is useful.

Figure 2:
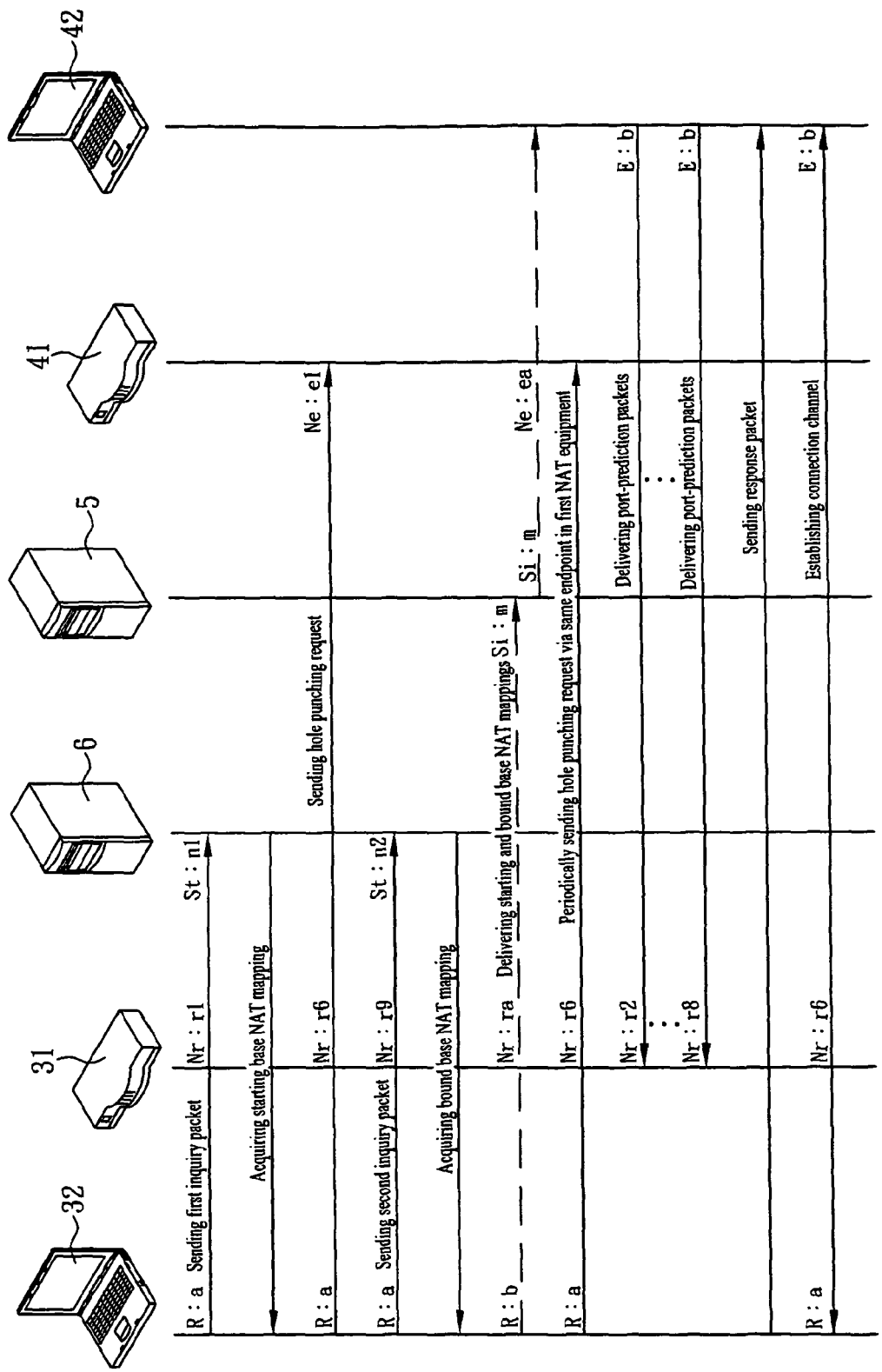
FIG. 2 is a time sequence diagram of establishing a connection channel between a first network terminal device and a second network terminal device according to a preferred embodiment of the present invention.
Figure 3:
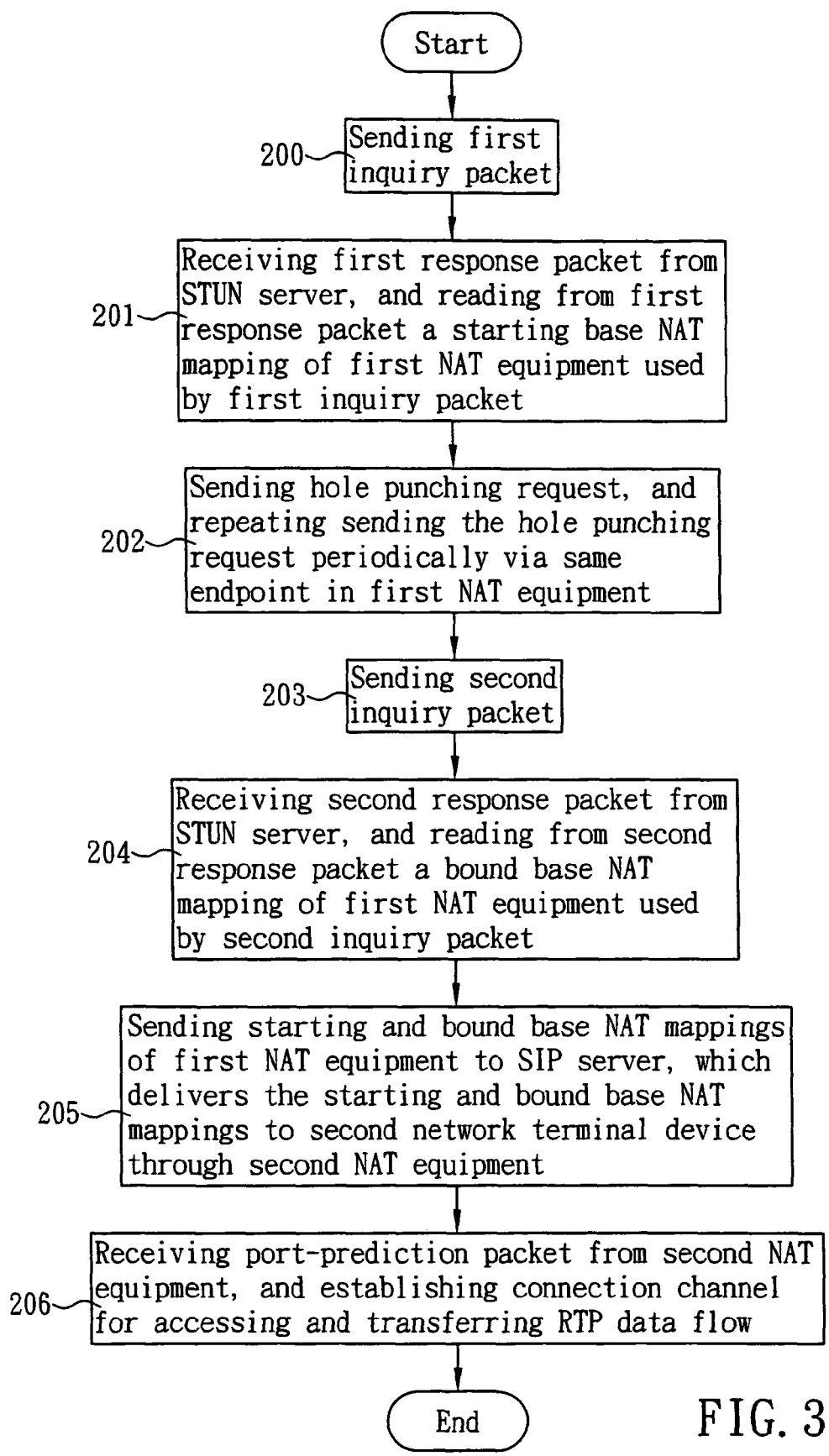
FIG. 3 is a flowchart for a user agent installed in a first network terminal device of a first private network according to the present invention.

Based on the operating principles of the aforesaid SIP and STUN protocols, the inventor of the present invention provides a method for predicting a port number of a NAT equipment according to results of inquiring a STUN server twice. Therefore, a network terminal device in one private network can rapidly and accurately predict, via a SIP server and the STUN server, a range of port numbers of a symmetric NAT equipment that are available for peer-to-peer connection. Also it can rapidly establish a connection channel with a network terminal device in another private network, so as to set up peer-to-peer connection for data access. As shown in FIG. 1, the method of the present invention is applicable to a network system 1 including the Internet 2, at least two private networks 3 and 4, a SIP server 5, and a STUN server 6. In an embodiment of the present invention described hereunder, a first private network 3 and a second private network 4 are provided for illustration, wherein each of the first and second private networks 3 and 4 includes at least one Network Address Translation (NAT) equipment and at least one network terminal device (such as a web camera, a VoIP phone, a network drive, a network printer and a computer provided with a network interface). In the embodiment of the present invention described hereunder, the first private network 3 includes a first NAT equipment 31 and a first network terminal device 32 while the second private network 4 includes a second NAT equipment 41 and a second network terminal device 42. Therein, the first NAT equipment 31 is a symmetric NAT equipment (such as a symmetric NAT router) and the second NAT equipment 41 is a symmetric NAT equipment or a cone NAT equipment. The symmetric NAT equipment dynamically adjusts port numbers in endpoint mappings according to a preset port differential λ of the NAT equipment each time a packet is sent and received, and sends and receives packets using the dynamically adjusted port numbers. On the other hand, the cone NAT equipment sends and receives packets through port numbers obtained from a fixed endpoint mapping. Other embodiments of the present invention are not limited to the aforesaid configuration. Hence, each of the first and second private networks 3 and 4 may alternatively include more than two network terminal devices. Each of the network terminal devices 32 and 42 is connected to the Internet 2 through the corresponding NAT equipments 31 and 41, so as to establish peer-to-peer connection via the SIP server 5 and STUN server 6 connected to the Internet 2. According to the present invention, user agents installed in the first and second network terminal devices 32 and 42 must be able to acquire from the STUN server 6 their respective NAT equipment data (such as NAT types and port differentials λ of the NAT equipments) through the STUN protocol, then send the NAT equipment data to each other through an ICE (Interactive Connectivity Establishment) protocol, and afterwards employ the method of the present invention to rapidly and accurately set up a connection channel for access and transfer of RTP data flow between the user agents installed respectively in the network terminal devices 32 and 42 of the private networks 3 and 4. Referring to FIGS. 2 and 3, according to the method of the present invention, the user agent installed in the first network terminal device 32 of the first private network 3 works by performing the following steps.

At a step 200, the user agent in the first network terminal device 32 sends a first inquiry packet through an endpoint in the first network terminal device 32 having an IP address and port number of R:a. The first inquiry packet is delivered to an endpoint in the STUN server 6 (having an IP address and port number of St:n1) via an endpoint in the first NAT equipment 31 (having an IP address and port number of Nr:r1).

At a step 201, the user agent in the first network terminal device 32 receives, through the endpoint in the first network terminal device 32 having the IP address and port number of R:a, a first response packet delivered from the STUN server 6, and reads from the first response packet a starting base NAT mapping Nr:r1 of the first NAT equipment 31 that was used by the first inquiry packet.

At a step 202, the user agent in the first network terminal device 32 sends a hole punching request through the endpoint in the first network terminal device 32 having the IP address and port number of R:a. The hole punching request is delivered through an endpoint in the first NAT equipment 31 (having an IP address and port number of Nr:r6) to an endpoint in the second NAT equipment 41 (having an IP address and port number of Ne:e1). Afterwards, the user agent repeats sending the hole punching request periodically via the same endpoint in the first NAT equipment 31 having the IP address and port number of Nr:r6.

At a step 203, the user agent in the first network terminal device 32 sends a second inquiry packet through the endpoint in the first network terminal device 32 having the IP address and port number of R:a. The second inquiry packet is delivered via an endpoint in the first NAT equipment 31 (having an IP address and port number of Nr:r9) to an endpoint in the STUN server 6 (having an IP address and port number of St:n2).

At a step 204, the user agent in the first network terminal device 32 receives, through the endpoint in the first network terminal device 32 having the IP address and port number of R:a, a second response packet delivered from the STUN server 6, and reads from the second response packet a bound base NAT mapping Nr:r9 of the first NAT equipment 31 that was used by the second inquiry packet.

At a step 205, the user agent in the first network terminal device 32 sends the starting base NAT mapping and the bound base NAT mapping of the first NAT equipment 31 through an endpoint in the first network terminal device 32 having an IP address and port number of R:b. The starting and bound base NAT mappings are delivered through the first NAT equipment 31 to an endpoint in the SIP server 5 (having an IP address and port number of Si:m). Afterwards, the SIP server 5 delivers the starting and bound base NAT mappings of the first NAT equipment 31 through an endpoint in the second NAT equipment 41 (having an IP address and port number of Ne:ea) to the second network terminal device 42, so that the user agent in the second network terminal device 42 acquires a port differential λ of the first NAT equipment 31 obtained by the user agent in the first network terminal device 32 from the STUN server 6, as well as the starting and bound base NAT mappings of the first NAT equipment 31, so as to accurately predict a range of port numbers of the first NAT equipment 31 that might have been used when the first network terminal device 32 sent the hole punching request, and send port-prediction packets to the predicted port numbers sequentially.

At a step 206, the user agent in the first network terminal device 32 receives, through the endpoint in the first network terminal device 32 having the IP address and port number of R:a, a port-prediction packet delivered from the second NAT equipment 41 via the endpoint in the first NAT equipment 31 having the IP address and port number of Nr:r6 and is thereby allowed to rapidly and accurately establish a connection channel with the user agent installed in the second network terminal device 42 of the second private network 4 through the endpoint in the first NAT equipment 31 having the IP address and port number of Nr:r6 for accessing and transferring RTP data flow.

Figure 4:
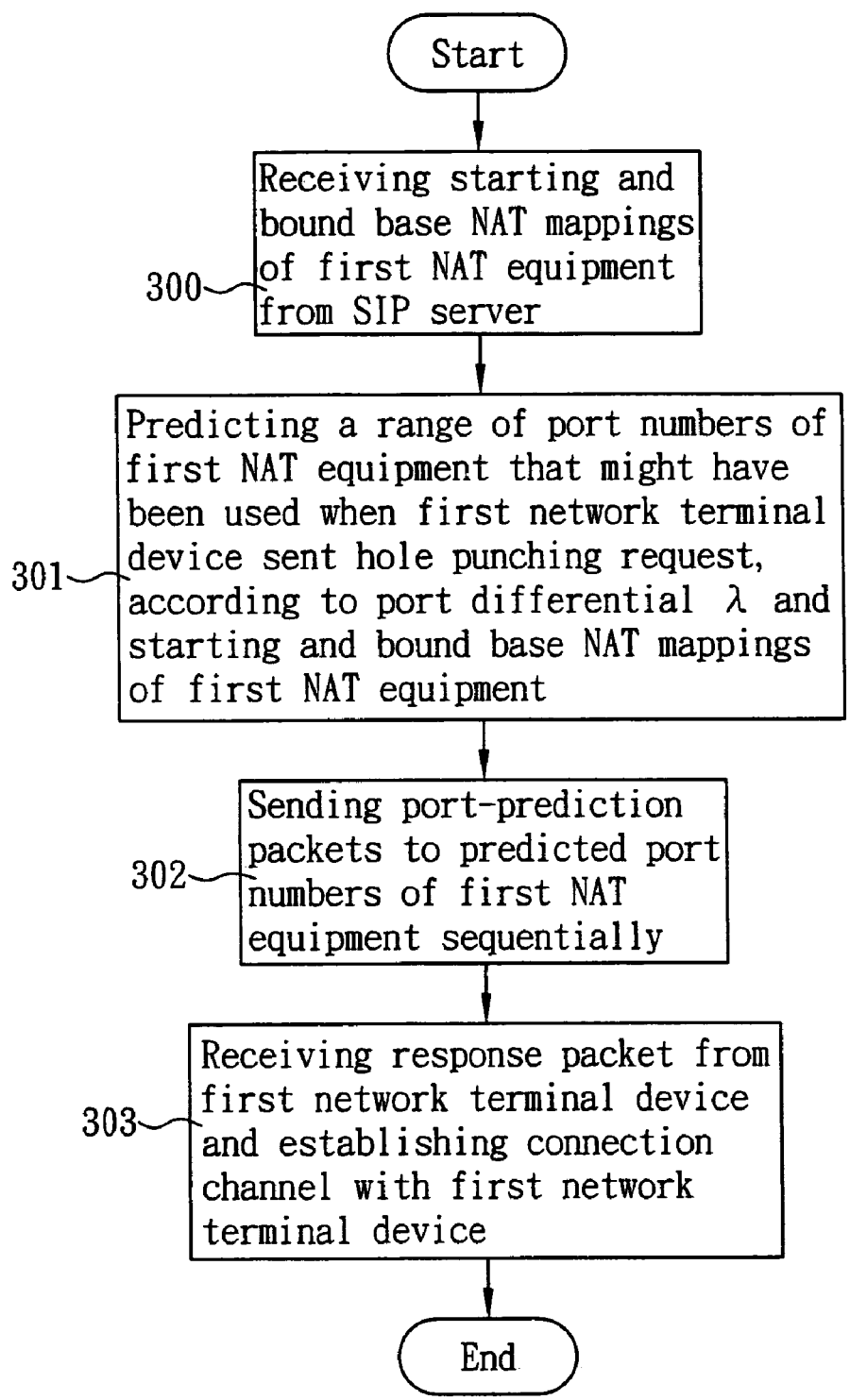
FIG. 4 is a flowchart for a user agent installed in a second network terminal device of a second private network according to the present invention.

According to method of the present invention, the user agent installed in the second network terminal device 42 of the second private network 4 functions by performing the following steps, as shown in FIGS. 2 and 4.

At a step 300, the user agent in the second network terminal device 42 receives, through an endpoint in the second network terminal device 42, the starting and bound base NAT mappings of the first NAT equipment 31 delivered from the SIP server 5.

At a step 301, the user agent in the second network terminal device 42 accurately predicts a range of port numbers of the first NAT equipment 31 that might have been used when the first network terminal device 32 sent the hole punching request, according to the port differential λ of the first NAT equipment 31 obtained from the STUN server 6 through the ICE protocol and the starting and bound base NAT mappings of the first NAT equipment 31. More particular, given that the first NAT equipment 31 delivered the first inquiry packet through the port number r1 and the second inquiry packet through the port number r9, if the port differential λ of the first NAT equipment 31 demands that one port number be dynamically adjusted each time a packet is sent and received, the user agent installed in the second network terminal device 42 can rapidly and accurately predict that the port number of the first NAT equipment 31 that might have been used when the first network terminal device 32 sent the hole punching request is one of r2, r3, r4, r5, r6, r7 and r8.

At a step 302, the user agent in the second network terminal device 42 sends, through an endpoint in the second network terminal device 42 having an IP address and port number of E:b, port-prediction packets to the predicted port numbers r2 to r8 of the first NAT equipment 31 sequentially.

At a step 303, the user agent in the second network terminal device 42 receives, through the endpoint in the second network terminal device 42 having the IP address and port number of E:b, a response packet sent from the first network terminal device 32 via the port number r6 of the first NAT equipment 31, and is thereby allowed to establish a connection channel with the first network terminal device 32. Thus, the second network terminal device 42 rapidly and accurately traverses the first NAT equipment 31 and sets up a connection channel with the first network terminal device 32 for accessing and transferring RTP data flow.

While the invention has been described by means of specific embodiments, numerous modifications and variations could be made by those skilled in the art without departing from the scope and spirit of the invention set forth in the claims.

The invention claimed is:

1. A method for establishing a connection channel between two network terminal devices by predicting a port number of a NAT (Network Address Translation) equipment according to results of inquiring a STUN (Simple Traversal of UDP (User Datagram Protocol) over NAT) server twice and then traversing the NAT equipment to establish the connection channel, said method being applicable to a network system comprising a STUN server, a SIP (Session Initiation Protocol) server and at least a first and a second private network, wherein the first private network comprises at least one first NAT equipment and at least one first network terminal device and the second private network comprises at least one second NAT equipment and at least one second network terminal device, the first NAT equipment being a symmetric NAT equipment, in which the first network terminal device is connected to the second network terminal device through the first NAT equipment and the second NAT equipment sequentially, the method comprising steps of:

the first network terminal device sequentially sending a first inquiry packet and a second inquiry packet to the STUN server via the first NAT equipment, and then acquiring two endpoint mappings of the first NAT equipment used respectively in the two inquiry packets from the STUN server, wherein the two endpoint mappings include a starting base NAT mapping of the first NAT equipment used in the first inquiry packet and a bound base NAT mapping of the first NAT equipment used in the second inquiry packet and, after acquiring the starting base NAT mapping and before acquiring the bound base NAT mapping, the first network terminal device periodically sends a hole punching request via an endpoint in the first NAT equipment to the second NAT equipment, so as to maintain the same endpoint in the first NAT equipment to be in an open status without being closed;

the first network terminal device delivering the starting and bound base NAT mappings to the second network terminal device via the SIP server;

the second network terminal device calculating a range of port numbers of the first NAT equipment that might have been used when the first network terminal device sent the hole punching request, according to the starting and bound base NAT mappings and a port differential of the first NAT equipment, wherein each of the first and second network terminal devices is installed with a user agent which can acquire the port differential of a corresponding one of the first and second NAT equipments from the STUN server through a STUN protocol, and deliver the acquired port differential to the other user agent through an ICE (Interactive Connectivity Establishment) protocol; and the second network terminal device sending port-prediction packets to the calculated port numbers of the first NAT equipment sequentially until a response packet is received from the first network terminal device and a connection channel is established with the first network terminal device.

2. The method of claim 1, wherein the STUN server and the SIP server are connected to the Internet, and the first and second private networks are connected with the STUN server and the SIP server through the Internet.

3. The method of claim 2, wherein the first NAT equipment is a symmetric NAT router.

4. The method of claim 3, wherein the second NAT equipment is a cone NAT router.

5. The method of claim 4, wherein each of the first and second network terminal devices is one of a web camera, a VoIP phone, a network drive, a network drive, a network printer and a computer equipped with a network interface.

* * * * *